(12) United States Patent
Glanzmann

(10) Patent No.: US 9,630,857 B2
(45) Date of Patent: Apr. 25, 2017

(54) SYSTEM AND METHOD FOR CLOSED WATER CIRCULATION

(75) Inventor: Arthur Glanzmann, Lucerne (CH)

(73) Assignee: Luxin (Green Planet) AG, Lucerne (CH)

( * ) Notice: Subject to any disclaimer, the term of this patent is extended or adjusted under 35 U.S.C. 154(b) by 308 days.

(21) Appl. No.: 14/345,180

(22) PCT Filed: Sep. 13, 2012

(86) PCT No.: PCT/EP2012/067921
§ 371 (c)(1),
(2), (4) Date: Mar. 14, 2014

(87) PCT Pub. No.: WO2013/037873
PCT Pub. Date: Mar. 21, 2013

(65) Prior Publication Data
US 2014/0231347 A1    Aug. 21, 2014

(30) Foreign Application Priority Data

Sep. 14, 2011    (EP) ...................................... 11181198

(51) Int. Cl.
*C02F 1/26*    (2006.01)
*B09C 1/02*    (2006.01)

(52) U.S. Cl.
CPC . *C02F 1/26* (2013.01); *B09C 1/02* (2013.01)

(58) Field of Classification Search
CPC ..................................... C02F 1/26; B09C 1/02
USPC .............. 210/767, 634, 805, 196, 191, 197, 210/167.01, 167.3, 170.01–170.11, 190; 405/36–41, 43–50, 53, 55
See application file for complete search history.

(56) References Cited

U.S. PATENT DOCUMENTS

| 5,622,864 | A | 4/1997 | Buchanan |
| 8,449,219 | B2 | 5/2013 | Burkhardt |

(Continued)

FOREIGN PATENT DOCUMENTS

| EP | 1787734 A2 | 5/2007 |
| EP | 2058441 A1 | 5/2009 |
| WO | 96/00624 A1 | 1/1996 |

OTHER PUBLICATIONS

International Preliminary Report on Patentability and Written Opinion mailed Mar. 18, 2014, issued in the corresponding International Application No. PCT/EP2012/067921, filed Sep. 13, 2012, 7 pages.

(Continued)

*Primary Examiner* — Madeline Gonzalez
(74) *Attorney, Agent, or Firm* — Christensen O'Connor Johnson Kindness PLLC

(57) ABSTRACT

System and method for a closed water circulation, comprising: a waterproof, outwardly delimited reservoir for collecting water, whereby a material is included and/or is placed in the reservoir, which is to be treated with water; a collection container, which is basically positioned on or near the bottom of the reservoir, whereby the collection container has at least one opening, through which the water can flow; a water extraction device to extract the water collected in the collection container from the reservoir; a conditioning device, designed to condition for reuse in the system the water extracted from the reservoir, and a recirculation device, designed to drive back into the reservoir the conditioned water.

20 Claims, 2 Drawing Sheets

(56) References Cited

U.S. PATENT DOCUMENTS

Figure 1:
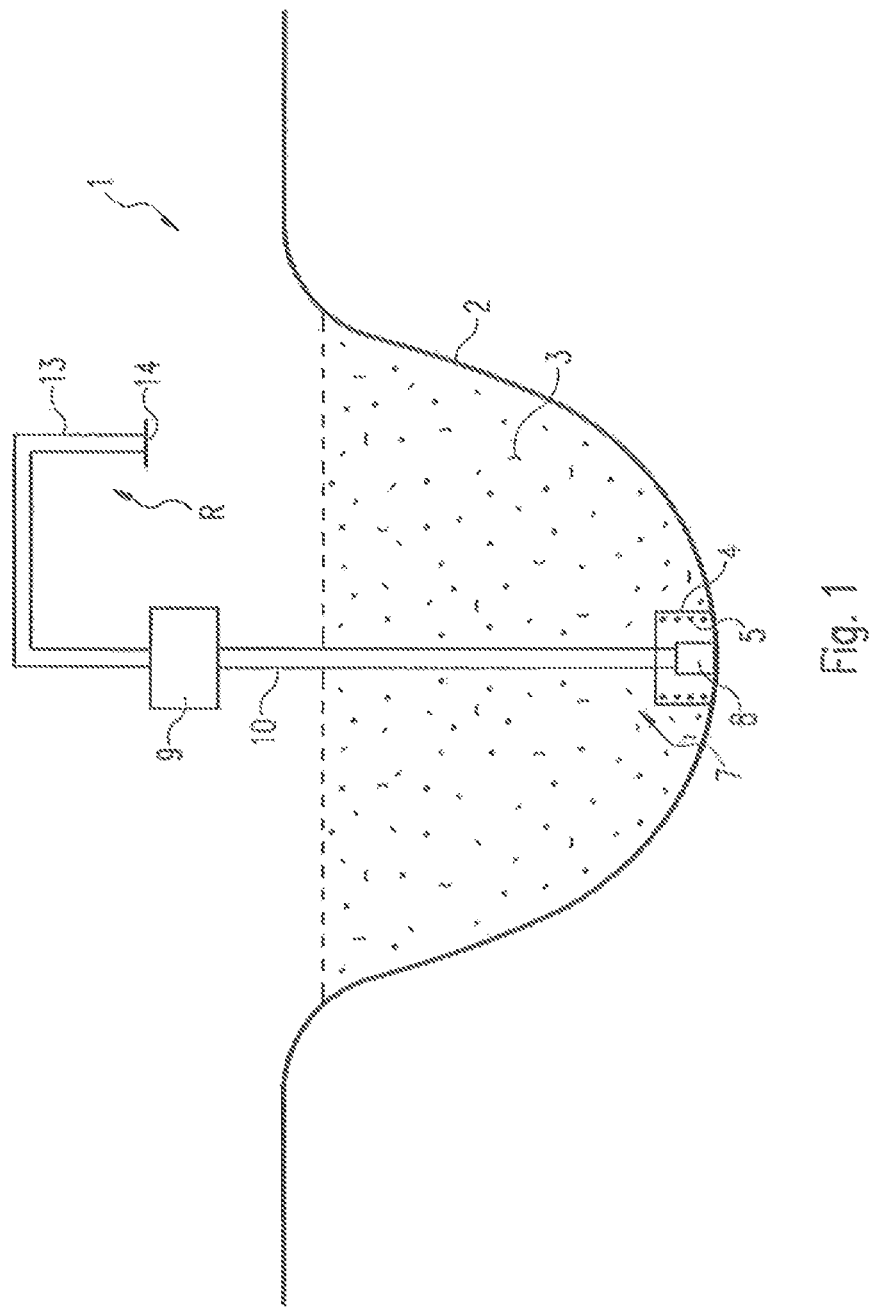

2011/0030951 A1* 2/2011 Irvine .................... E21B 37/08
166/278
2011/0188933 A1* 8/2011 Burkhardt ................ C02F 3/00
405/38

OTHER PUBLICATIONS

International Search Report mailed Nov. 21, 2012, issued in the corresponding International Application No. PCT/EP2012/067921, filed Sep. 13, 2012, 3 pages.

* cited by examiner

SYSTEM AND METHOD FOR CLOSED WATER CIRCULATION

The invention refers to a system and method for a closed water circulation.

For example, with the amalgam method for eluting gold, pure mercury is used to envelop the gold particles and then is left over as amalgam lumps. During this process, some of the mercury remains stuck on the material that is to be eluted, for example, fine-grained sediments, and then gets back into the environment along with the remaining soil material, usually without any additional treatment.

Another example is red mud, which is a waste product resulting from the production of aluminum. Red mud builds up as residue when the aluminum is extracted during the production of aluminum and is strongly alkaline. Today still, there are zones in which red mud is deposited or led back into the environment without taking any precautions. Usually, however, the mud is stored in landfills. Then, the hydroxides and silicates, available as dispersion, sediment, and the resulting sodium hydroxide is recycled. This process is highly time-consuming.

Now, the purpose of the invention is to provide a system and a procedure for a closed water circuit, for example in order to treat a certain material with water, which facilitates an environmentally friendly, effective, and efficient application.

This purpose is achieved through the independent claims. The dependent claims form the core concept of the invention in a particularly beneficial manner.

Firstly, the invention provides a closed water circuit that features the following: at least one waterproof, outwardly delimited reservoir for collecting water, whereby the material that is to be treated with water is included and/or is placed in the reservoir; at least one collection container, which is placed on, or close to, the bottom of the reservoir, whereby the collection container has at least one opening, through which water can flow; at least one water extraction device to eject from the reservoir the water collected in the collection container; at least one conditioning device designed to condition the water extracted from the reservoir for reuse in the system; and at least one recirculation device designed to recirculate the conditioned water back into the reservoir.

The system designed by this invention can easily prevent the contamination of the surrounding environmental system and especially of the groundwater with substances or materials carried along into water or purged by water while treating materials (i.e. chemicals carried along or purged mercury). This way, for example, sediment contaminated with mercury during the production of aluminum can be purged of mercury without unnecessarily affecting the groundwater. Furthermore, purging sodium hydroxide in red mud is facilitated through the closed water circuit. This system proves to be particularly advantageous for all types of particular water-using installations, such as, for example, industrial, farming, agro-industrial, landscaping systems and applications, and it can be used both indoors and outdoors. The waterproof, outwardly delimited reservoir prevents the contamination of groundwater by harmful substances (i.e. chemicals and the like).

A system as well as installations equipped with our system and its applications facilitate a self-sufficient water supply, while at the same time preventing the ejection of water from the system with potential harmful consequences for the environment. Again, the invention also prevents or at least minimizes losing water from the system, while the water or material already included in the system is conditioned for any reuse, and thus, the water and the water supply in the system can be sensibly managed.

The material included and/or placed in the reservoir may be, for example, bulk material that fills at least partially the reservoir (i.e. with mercury-contaminated sediment or red mud), or it may be material that covers at least partially the inner wall of the reservoir (i.e. salt in a salt dome). Thus, the system can be used in various ways.

The collection container preferably extends in the reservoir from its bottom upwards at least to the top of the material in the reservoir, whereby the collection container has a second opening above the material, through which the water can be easily extracted. The collection container is preferably designed as a well or a knife rest, which makes the extraction of water from the reservoir particularly simple.

The water extraction from the collection container can be simplified by preferably using at least one pumping system as a water extraction device. In this case, the pumping system of the water extraction device may be either positioned in the collection container, so that it extends through a pipeline from the reservoir out to the conditioning device, or the pumping system may be placed outside the reservoir and connected to the collection container through a flow-optimized pipeline. This way, the contaminated water can be automatically and preferably drained out of the collection container and into the conditioning device.

In a particularly preferred embodiment, the reservoir is designed as a collection tank or includes artificial or natural hollows, like mines for example, which further enhances the use of the system. In this case, the reservoir is preferably designed to have the shape of a tub, or hemisphere, or hollow.

In addition, the reservoir contains at least one geotextile. This way, the reservoir is simply and strongly built to be waterproof and outwardly delimited.

The water placed in the system is preferably displaced by substances or materials, which are used to treat the material in the reservoir, and which are driven back to the water in the conditioning device. This way, a constant and desired treatment respectively of the material in the reservoir can be achieved at any time by holding constant or selectively adjusting the concentration of the substance or material in the water present in the closed water circuit.

Furthermore, it is possible to equip the conditioning device with at least one cleaning component designed specifically to clean the contaminated water in the reservoir. Impurities can be preferably extracted from the system by at least one output line in order, for example, to be reused. Instead of adding the substances or materials in the water, the conditioning consists now of eluting and removing respectively a substance or material, that water eluted out of the material present in the reservoir. This can be further extracted from the water in the conditioning device (i.e. through filters or other cleaning systems), so that the material can be recycled for further use, whereas the water itself in the closed system can be cleaned and/or enriched with the substances extracted for treatment, so that it can be reused in the system.

Moreover, the system can be equipped with at least one feed line which could supply, from the outside, water, for example, or substances or materials to be added to the water. This makes it possible to maintain the water content within the closed system when the water is lost by evaporation, for example. Furthermore, the supply of substances added to the water can maintain constant or adjust as desired the effect of the treatment of the water displaced by this substance.

According to a particularly preferred embodiment, the system is functionally connected with naturally and/or artificially created areas and/or green spaces. This makes it possible to integrate the system in an environment, in which artificially produced or natural events, i.e. related to a golf course or a hotel parking lot, may serve as a necessary "sewage plant" of the system. Thus, the system can be provided for any conceivable water-using facility as its own autonomous water-management and water-cleaning system by functionally integrating the external natural or artificial areas.

The areas or fields belonging to the system can be preferably and completely separated from their natural environment using water technology, so that they can be self-sufficiently managed.

In addition, the invention includes an installation for industrial, farming, agro-industrial, or landscaping activities, which features a system according to the invention. Moreover, the invention presents a procedure for a closed water circuit.

The invention shall be now described using embodiment examples, which are illustrated in the figures of the enclosed drawings.

Figure 2:
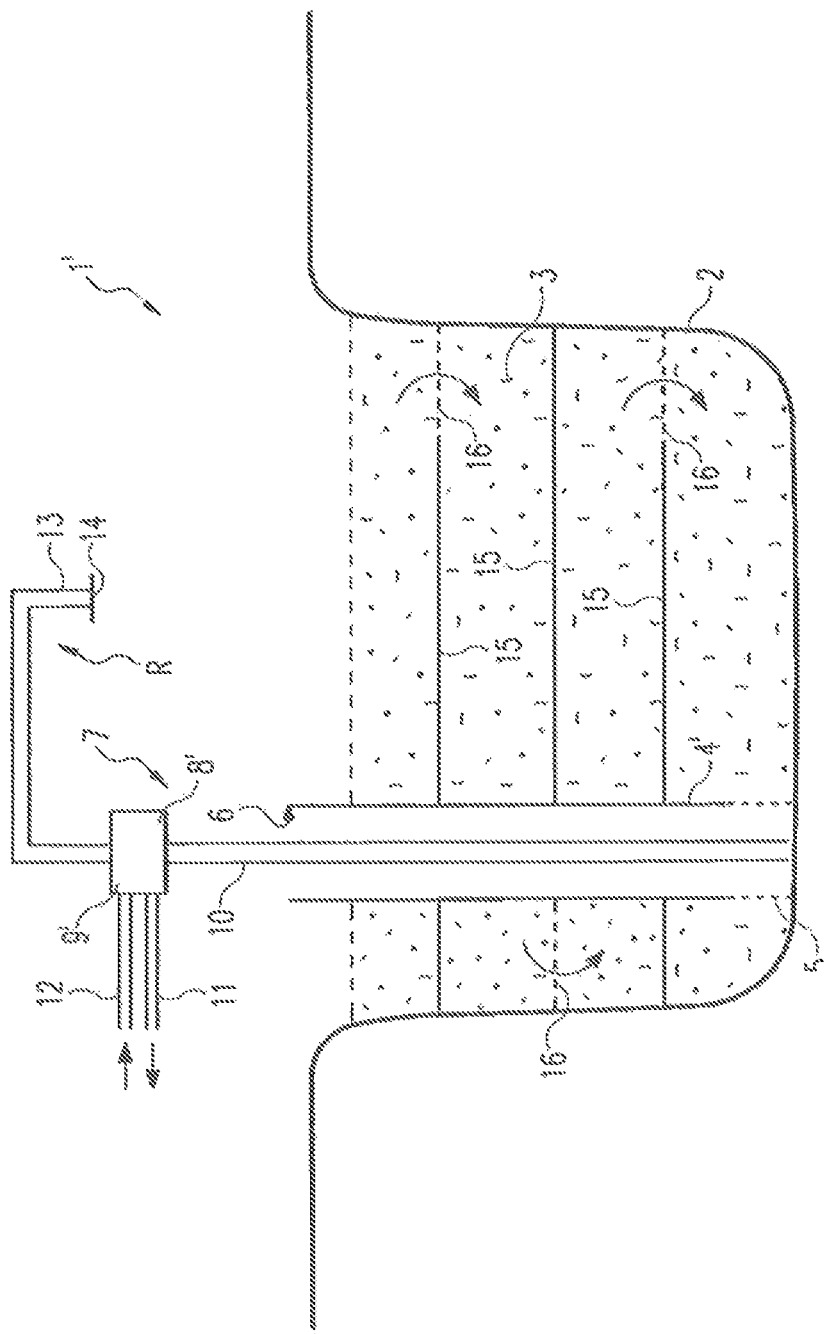

FIG. 1 shows a closed water circuit, according to a first embodiment example, and FIG. 2 shows a closed water circuit, according to a second embodiment example.

FIGS. 1 and 2 show different embodiments respectively of a closed water circuit 1, 1', according to the invention, whereby all the further described features and configurations of both systems 1, 1' can be combined with each other in any desired way. Identical features are marked with the same reference signs.

The system 1, 1' consists basically of a waterproof, outwardly delimited reservoir 2. Although only one reservoir 2 is shown in the figures of the enclosed drawings, reservoir 2 may be comprised of several reservoirs, which can be completely or partially connected to each other or separated from each other functionally.

The reservoir 2 may be equipped with at least one artificial or natural collection tank or at least one artificial or natural hollow, of a mine, for example. However, the reservoir 2 is not absolutely limited to a specific shape; on the contrary, the reservoir 2 may have any conceivable shape, particularly that of a tub, a hemisphere, or a hollow. In other words, the reservoir 2 may have any suitable shape and/or size.

Such a reservoir 2 makes it possible that preferably no water from the system 1, 1', according to the invention, gets out into the environment, especially not into deeper, porous, hygroscopic or water-conducting layers and into groundwater. This way, we can prevent a contamination of the environment and particularly of the groundwater with the (toxic and polluting respectively) substances or materials found in the system 1, 1'.

Furthermore, the reservoir 2 presents the advantage that the System 1, 1', according to the invention, may be used on-site anywhere, independently of the geological structure, climate, and/or soil. Therefore, the system 1, 1' may be used, for example, for and/or in all conceivable industrial, farming, agro-industrial, or landscaping and similar installations and applications. Likewise, the system 1, 1' may be used in any indoor or outdoor area.

A material 3 is included and/or placed in the reservoir 2. This material 3 may be for example bulk material that fills the reservoir 2 at least partially, such as, for example, the sediment contaminated with mercury resulting from gold extraction, or red mud, or a material that covers at least partially the inner wall of the reservoir 2, such as, for example, salt in a salt dome. Of course, the invention is not limited to the afore-mentioned materials; on the contrary, any desired material 3 or even different materials 3 may be included in the reservoir 2 or on its inner wall, or in any manner (also combinations of the above), so that it can be treated in a closed water circuit.

Water is used preferably to treat the material 3 according to the invention. However, the invention is not limited to water as a treatment medium. Therefore, the term "water" used in the application may include any conceivable, preferred fluid treatment and cleaning medium respectively.

The system 1, 1' is further equipped with at least one collection container 4, which is basically positioned on or close to the bottom of the reservoir 2. Further, the collection container 4 has at least one or more openings 5, preferably located in the immediate proximity of the bottom or the floor of the reservoir 2 respectively, and through which the water can flow into the collection container 4; that is particularly water that has been directed straight into reservoir 2 for treating the material 3 in the system 1, 1'. "Proximity" is defined in this invention so that both the collection container 4 and its openings 5 are positioned in the reservoir 2 in such a way that infiltrating water or water infiltrating through the material 3 can be essentially collected safely and completely in the collection container 4.

Preferably, there is a hole or slit in opening 5. However, opening 5 may take any other suitable shape and size, whereby the shape and size may be identical or different when we have several openings 5. Particularly preferred is the fact that the size of the opening 5 may be selected to vary, and preferably to be infinitely adjustable between a fully closed and a fully open phase.

By choosing the number, size, and shape of the openings 5, we can vary the speed with which the water infiltrates in the water collection container 4. When selecting the size and the shape of the openings 5, we have to make sure that, if possible, no material 3 gets in the water collection container 4.

As shown in FIG. 1, the collection container 4 extends or is placed respectively only on or near the bottom of the reservoir 2. However, it is also possible for the collection container 4' to extend in reservoir 2 from its bottom upward, preferably at least up to the top of the material 3 in the reservoir 2 (see FIG. 2). In this case the collection container 4' should preferably have, on top of the material 3, an additional opening 6, that can preferably be closed, through which the water can have easy access to the collection container 4 and can be extracted from reservoir 2. The collection container 4 may be designed, for example, as a well, or also as a knife rest, or in any other way. It is also feasible to have different configurations of several collection containers 4, 4' in a reservoir 2 and in system 1, 1' respectively.

The system 1, 1' also has at least one water extraction device 7, by which the water collected in the collection container 4, 4' can be extracted from reservoir 2. The water extraction device 7 is preferably equipped with at least one pumping system 8, 8'. The pumping system 8, 8' may be placed, as shown in FIG. 1, for example, in the collection container 4. Alternatively or additionally, the pumping system 8' may also be located on the outside of the reservoir 2, preferably above the upper area of the material 3 found in the reservoir 2 (see FIG. 2).

We can vary the flow speed of the water through the entire system 1, 1', particularly through the material 3, by draining the water from the collection container 4. This way, we can also vary the retention time of the infiltrating and directed water respectively through the material 3 within the system 1, 1', according to the invention, which in turn impacts the quality of the water treatment. Depending on the material 3 that is to be treated, a higher or lower flow speed and/or retention time of the water in the material 3 may be advantageous.

In addition, the system 1, 1' is equipped with at least one conditioning device 9, 9', designed by flow engineering to be situated downstream from the collection container 4, thus located downstream from the collection container 4. The conditioning device 9, 9' is placed in this case preferably outside the reservoir 2, especially above material 3.

The conditioning device 9, 9' is connected to the collection container 4, 4', preferably by one or more pipelines 10 of the water extraction device 7, and these spread, or are extended respectively, preferably into the collection container 4, 4'. It is particularly preferred that the pipeline 10 should extend to the bottom or close to the bottom of the collection container 4, 4', in order to reach water amounts, albeit small, collected in the collection container 4, 4'.

As shown in FIG. 1, the pipeline 10 extends then from the pumping system 5, found in the collection container 4, through the material 3 and out of the reservoir 2 up to the conditioning device 9.

As shown in FIG. 2, the pipeline 10 may also extend basically from the bottom of the collection container 4', that is of the reservoir 2, out through the well-shaped collection container 4' upward toward the reservoir 2 and out up to the conditioning device 9'. In FIG. 2, the pumping system 8' is illustrated as one unit together with the conditioning device 9'.

However, it also generally conceivable to provide the pumping system 8, 8' separately from the collection container 4, 4' and/or the conditioning device 9, 9'. Particularly, it should be done in such a way that the pumping system 8, 8' may be able to drain the water from the collection container 4, 4' and into the conditioning device 9, 9'. To this effect, it may be designed or placed respectively inside or outside the reservoir 2, exactly inside or outside the collection container 4, 4', and/or downstream or upstream from the conditioning device 9, 9' or together with it.

The conditioning device 9, 9' is designed in such a way that it can itself condition the water extracted from reservoir 2 in order to be reused particularly in the system 1, 1'. For this purpose, the conditioning device 9, 9' may be equipped, for example, with filter systems or chemical conditioning systems or other adequate water-conditioning systems.

Furthermore, the conditioning device 9, 9' may be designed as a separator or the like, in order to separate from water, for example, substances or materials carried along with the water.

Thus the conditioning device 9, 9' may be designed as a cleaning device, which can clean the contaminated water in the reservoir 2. Any incidental impurities, that were isolated after the cleaning process by the conditioning device 9, 9', may be extracted, for example, through at least one pipeline 11 (see FIG. 2) from and out of the system 1, 1' respectively and may be conditioned for reuse outside or inside the system 1, 1'.

Additionally or alternatively, it is also conceivable to add substances or materials to the water or to replace the water with these substances or materials in the conditioning device 9, 9', which help treat the material 3 in the reservoir 2. For this purpose, the system 1, 1' may be also equipped with preferably at least one feed line 12, which leads, for example, to the conditioning device 9, 9', or one pipeline of the closed water circuit, or into the reservoir 2.

Additionally or alternatively, it is conceivable to have the feed line supply water into the system 1, 1', in order to supply, for example, to the system 1, 1', water that is lost by evaporation. In this way, we can maintain a constant water content in the system 1, 1'. Although FIG. 2 presents only one feed line 12 and one drainage pipeline 11, we may also have several supply and/or drainage pipelines. As we have already explained, the system 1 shown in FIG. 1 can also have any feed lines 12 and drainage pipelines 11.

The impurities filtered out or isolated in the conditioning device 9, 9' may also be found, at least in part, in the chemicals or other substances or materials included in the material 3 that is to be treated, for example mercury, which remains in the sediment (=material 3) during the exploitation of gold. So the system 1, 1' makes it possible to elute and wash out respectively these substances and materials out of material 3, or at least to extract them from the water circuit, and thus to make these substances available for other applications (here, for example, for another gold elution).

Furthermore, for example, the substance added to water for treatment or the materials from the impurities drained, for example, through the drainage pipeline 11 can be retrieved and made available to the system 1, 1', for example, through the feed line 12. This process may occur also directly inside the conditioning device 9, 9' and the system 1, 1' respectively, so that only additional impurities potentially built up can be drained out of the system 1, 1'.

Moreover, the system 1, 1' has a recirculation device R, which enables the recirculation of the conditioned water into the reservoir 2. This recirculation device R can have, for example, only at least one recirculation pipeline 13. In addition however, the recirculation pipeline 13, after conditioning and before the water is supplied into the reservoir 2, the water may also run through additional steps in the recirculation device R for conditioning and/or treatment or the like in a used installation, whereby a closed water circuit is maintained. In order to enable the water to go back, the recirculation device 13 should be preferably equipped with a pumping system not presented here; alternatively or additionally, the already described pumping system 8, 8' may also serve for this purpose, since it enables the water to be directed through the entire system.

In the Figures, the recirculation pipeline 13 has preferably a nozzle and/or a valve 14 on its end that is away from the conditioning device 9, 9'. A nozzle can, for example, channel the escaping water into the reservoir 2, or raise it above the material 3 or, disperse it, respectively, as a shower head would do it, for example. Moreover, using an additional or alternatively provided valve, we can control the water inflow amount into the reservoir 2 selectively and preferably on infinitely adjustable settings.

It is furthermore conceivable that the system 1, 1' has one fully or partially automatic control device (not shown), with which the system 1, 1' can be operated. So it is possible, for example, to supply water and/or substances or materials that are to be replaced by water, automatically through the feed line, using a combination of any desired and provided sensors, to divert impurities from the system 1, 1' through the drainage pipeline 11, to install a valve opening or nozzle setting at the end of the recirculation pipeline 13, and also to selectively adjust the drainage output of the water extraction device 7. These settings may be based on measurement results of the contamination level of the water or of other fluids, for example.

In order to achieve a homogenous treatment of the material 3 with a substance or material that displaced water, and in order to boost the quality of the treatment, the system 1, 1' also has one or more barrier layers 15, positioned inside the reservoir 2. Moreover, the barrier layer 15 is equipped with at least one outlet 16 for water. Except for outlet 16, which is water-permeable, the barrier layer 15 is made of a material that is essentially waterproof. In the context of this invention, "essentially waterproof" means that the barrier layer 15 is designed so that the majority of the water, which infiltrates through the reservoir 2, and so through the material 3, is prevented from reaching through the barrier layer 15 through the area above and under the barrier layer 15 respectively. The barrier layer 15 helps expand the water infiltration path through the material 3 in the reservoir 2. The expansion of the water infiltration path makes the water remain longer in the material 3 and have a better volume distribution, so that the treatment quality may be distinctly raised.

The pipelines 10 that run through the barrier layer 15 or the collection container 4, 4' may be positioned in such a way that their connection with the barrier layer 15 works like a particularly waterproof seal. However, the connection may also be water-permeable, so that a small portion of the water may flow at least partially along the pipelines 10 or collection container 4, 4' (that is at the most enough water to allow for a meandering flow of the remaining water along the preset path through the barrier layer 15 for an adequate treatment), whereby the volume of the material 3 permeated by water may be still increased.

Preferably the barrier layers 15 are essentially positioned horizontally, so that this positioning may allow for the longest water infiltration path through the system 1, 1', which has a particularly positive impact on the treatment quality. However, any other slanting of the barrier layers 15 is possible, if we can preserve the function of the barrier layer 15 to expand the water infiltration path. The individual barrier layers 15 inside the system 1, 1' may always have the same slanting angle, while they may be different from each other in terms of their slanting angle as needed.

The outlet 16 for water takes up only a small area compared to the total area of the barrier layer 15. Preferably, this should be an area of 5 to 20% of the total area of the barrier layer 15.

The outlet 16 for water is positioned preferably on a select place. For example, the outlet 16 may be positioned on the outside area of the barrier layer 15 that is close to the edge area of the reservoir 2, as also illustrated in FIG. 2. The outlet 16 for water is located preferably immediately before the end or directly on the end of barrier layer 15 that is on or close to an area where the barrier layer 15 has direct contact with the reservoir 2. If the water infiltrates first in an edge area through the barrier layer 15, then the trajectory of the water running back along the barrier layer 15 is approximately the longest possible one. In this case, we can perform particularly well the treatment of the material 3 on the largest possible area.

Furthermore, the number, size and/or shape of the outlet 16 makes it possible to vary, as desired, the water flow speed through the system 1, 1' and this way to adjust the treatment of the material 3 as needed. The outlet 16 may come shaped as a slit or hole, but any other shape is also conceivable.

If there are at least two barrier layers 15, then it is particularly advantageous to have the outlet 16 offset by two adjacent barrier layers 15 respectively, particularly if they are positioned preferably opposing each other. This offset position of the outlet 16 for water expands the water infiltration path through the system 1, 1', so that the water retention time for an adequate treatment inside the system 1, 1' is increased, and also the volume of the material 3 can be permeated with water on the largest possible area. The arrows in FIG. 2 indicate the water infiltration path through the outlets 16 of the barrier layers 15.

In a particularly preferred embodiment, the reservoir 2 and/or the barrier layer 15 include a geotextile. The geotextile, in its simplest embodiment, is comprised of a layer of fabric or fleece, which is particularly interwoven preferably with polyurethane.

Using a geotextile has the advantage of preventing, in a particularly effective manner, undesired water as well as impurities leaks from the reservoir 2 into the environment, for example into the ground water. This way, we can definitely prevent the spilling into the groundwater of harmful chemicals or the like, which are transported with the conditioned water for treatment in the reservoir 2, or which are ejected from the material 3. This is particularly advantageous for a system 1, 1' with an installation on the outside, or when the system 1, 1' is located in a mine.

Another advantage of the geotextile is generally its resistance to thermal changes and mechanical shifts in the floor structure (i.e. in the case of an earthquake) and so it prevents the destruction of the waterproof reservoir 2. Due to its stability and weather-resistance, it also has a longer lifetime since it is resistant to damages by roots or sharp rocks.

Moreover, it is advantageous that the outside shape of the geotextile can be adjusted to the landscape of the site, especially if the system 1, 1' is installed on the outside area. Consequently, a reservoir, equipped with a geotextile, may be installed in an extremely flexible way. Again, this saves time and additional construction costs.

The fleece used for the geotextile may also have, for example, wires or laminar structures made of elastomers/polymers, primarily based on natural raw materials. Furthermore, synthetic staple fibers with a length of several centimeters, for example, may be included. The staple fibers and the wires and/or laminas, if applicable, may be interwoven in such a way that the strength of the fleece and geotextile respectively is independent of the direction. This way, a flexible floor area formation can be achieved with a good adjustment to the existing subsoil without any danger of structural damages.

If the geotextile includes a fabric, this fabric made of crossing threads and fiber systems (fiber materials) serves preferably only for testing as well as for the inclusion of polyurethane. Reference is made to EP 2 058 441 regarding the production and installation of a geotextile in a reservoir 2 and as barrier layer 15 respectively.

The reservoir is not limited to a geotextile in order to be built waterproof and outwardly delimited. On the contrary, other materials or also the natural occurrences around the system 1, 1' (for example aquifuges in a geological layer) are also conceivable for the desired effect. Furthermore, the reservoir may be also built, through an artificial collection tub, of a material resistant to the materials and substances that are to be used.

In a particularly preferred embodiment, the system 1, 1' is also functionally connected with natural and/or artificially created areas or green spaces. This way, it is possible, for example, to provide, as a necessary "sewage plant," to a hotel or industrial facility or to any other water-using facility, its own autonomous water-management and water-cleaning system by functionally integrating the external natural or artificial areas, for example of a golf course or of a hotel parking lot.

Particularly preferred are the areas or fields that belong to the system 1, 1' and that are completely separated from their natural environment using water technology. This makes it possible to manage separately the system 1, 1' or installation, respectively.

As part of the invention, it is particularly advantageous for the treatment of radioactively contaminated materials 3 to equip the reservoir 2 with clay rocks, such as those available, for example, in the Opalinus clay rock formation in the Jura Mountains. This is particularly beneficial in the case of uranium-contaminated materials 3 from mines (i.e. the mine, in which the reservoir 2 is installed) or other radioactively contaminated materials 3. The clay minerals contained by clay rocks (i.e. kaolinite) contribute to binding the radioactive substances, which can be thus cleaned out of the water used for the treatment of the materials 3, which has previously eluted the radioactive substances from material 3. The cleaning of materials 3 in the reservoir 2 can be further improved in combination with the iron minerals present in the clay rocks, which trigger a reduction of the radioactive substances and inherently of their accumulation in the clay rocks.

Additionally or alternatively, it is possible to have natural clay (particularly one containing clay minerals) on the walls of the reservoir 2 to clean the material 3 and the water used for the treatment of the material 3 respectively. For this purpose, a layer of clay may be applied on the inner wall of the reservoir 2, especially if the reservoir 2 is not installed in a clay rock environment (i.e. in a mine). The clay layer may be removed and disposed of in an environmentally responsible manner, or stored and conditioned respectively, once it has sufficiently bound these radioactive substances or when it becomes saturated with these radioactive substances. If the reservoir 2 is provided with clay rock, then the top clay layer on the inner walls of the reservoir 2, for example, may be periodically removed and disposed of respectively, or conditioned, in order to remove the strongly contaminated clay layers and to continue the cleaning with a "fresh" clay layer, which can be applied again if needed.

Furthermore, it is conceivable that by using clay, the system may be equipped with absorbing partition walls, partition layers, or cleaning layers (made of clay or clay rocks). For this purpose, the partition walls, partition layers, or cleaning layers are to be situated preferably in places in the system—or also separately, that is, for example, outside of the reservoir 2—, where (contaminated) materials 3 and/or water lie stagnant or flow through.

The embodiment examples indicate that clay partition walls, partition layers, or cleaning layers may be provided, for example, in the collection container 4, 4', in the conditioning device 9, 9', or in the pipelines 10, 11, 13, or in any other appropriate places of the system 1, 1'. For example, the barrier layer 15 or the conditioning device 9, 9' may also be built of an adequate clay. Likewise, it is conceivable to provide additional clay barrier layers as partition walls and cleaning device, especially for water contaminated with radioactive substances. For example, the openings 5 or the outlet 16 may be filled with clay, so that the water is filtered and thus cleaned of radioactive substances when passing through the opening 5 and the outlet 16 respectively as it has to flow through clay.

It is furthermore conceivable to provide clay to the system as a filter element, i.e. as loose clay particles, so that it comes into contact with the material 3 or with the contaminated water that treats the material 3 and can bind the radioactive substances contained in the material 3 or eluted from the material 3 and drained in the water. In other words, the clay must not be provided as a layer or a wall, but instead it may be provided in any form, i.e. "compact" (as clay tiles or clay lumps), "compactly positioned" (as a partition layer or a partition wall), "loosely spread" (as filter particles in a (restricted) filter housing) or "randomly loose" (i.e. mixed in the contaminated material 3 or water). Preferably, the clay and the clay rock respectively should be provided in such a way that it can be selectively replaced or removed when a predetermined amount of contaminated (radioactive) substances gets bound to it. This way, we provide an effective cleaning device especially for radioactively contaminated materials 3.

A procedure for a closed water circuit, according to the invention, is described below.

According to the invention, the procedure for a closed water circuit has the following steps:

In the first step, a material included or placed in the waterproof and outwardly delimited reservoir 2 is treated with water. The treatment may include, for example, eluting the impurities from the material 3. In the second step, the water is collected in a collection container 4, 4' positioned basically on or close to the bottom of the reservoir 2, whereby the collection container 4, 4' has at least one opening 5, through which the water flows into the collection container 4, 4'. In the third step, the water collected in the collection container 4, 4' is extracted from the reservoir 2, using a water extraction device 7. For this purpose, the water extraction device 7 may have a pumping system, through which the water is directed from the collection container to the conditioning device 9, 9' and preferably further through the recirculation device R or recirculation pipeline 13 respectively, until it gets back into reservoir 2. In the fourth step, the water extracted from the reservoir 2 is conditioned in a conditioning device 9, 9'. The conditioning preferably includes the displacement of the water by a substance or material needed for the treatment, or the cleaning of water by isolating one of the water-contaminating substances or materials in the reservoir 2. In the last step, the conditioned water is driven back into the reservoir 2 through a recirculation device R.

The invention is not limited to the embodiment examples described above. On the contrary, the examples described herein may be combined.

Thus, the invention is not limited, for example, to a certain number of reservoirs per system. Furthermore, the water recirculation may be designed in any desired way. Again, the positioning of the pumping system is not restrictive; on the contrary, the pumping system is positioned so that it makes it possible to run the water at least from the collection container through the conditioning device and, if needed, back into the reservoir, whereby a pipeline system necessary for this may be designed if needed in any desired way. According to the invention, the material found in reservoir 2 and which has to be treated is also not restricted.

Furthermore, it is conceivable to interconnect several systems, according to the invention, to a facility that has a closed water circuit. This allows for the performance of a gradual treatment of the water or material 3, or for parallel different processes.

Moreover, it is conceivable to extract substances from the impurities accumulated in a system or that the impurities may present substances respectively that may be fed into this system or into a subsequent system, according to the invention, particularly into the water used to treat the same or another material 3.

The invention claimed is:

1. A system for closed water circulation, comprising:
   a waterproof, outwardly delimited reservoir for collecting water;
   a material provided in the reservoir, which is to be treated with water;
   a collection container located within the reservoir and positioned on or near the bottom of the reservoir, whereby the collection container includes at least one opening, through which the water can flow;
   a water extraction device to extract the water collected in the collection container from the reservoir;
   a conditioning device, designed to condition for reuse in the system the water extracted from the reservoir; and
   a recirculation device, designed to drive back into the reservoir the conditioned water.

2. The system according to claim 1, whereby the material is bulk material that fills at least partially the reservoir or material that covers at least partially the inner wall of the reservoir.

3. The system according to claim 1, whereby the collection container extends in the reservoir from its bottom upwards, at least up to above the material that is to be treated in the reservoir, whereby the collection container includes a second opening on top of the material through which the water can be extracted.

4. The system according to claim 3, whereby the collection container is a well or a knife rest.

5. The system according to claim 1, whereby the water extraction device includes a pumping system.

6. The system according to claim 1, whereby the reservoir includes at least one collection tank or artificial or natural hollows.

7. The system according to claim 1, whereby the reservoir includes a geotextile.

8. The system according to claim 1, whereby the water is displaced by substances or materials, which help treat the material in the reservoir and which are driven back to the water in the conditioning device.

9. The system according to claim 1, whereby the conditioning device has a cleaning component, designed to clean the water contaminated in the reservoir, whereby impurities can be extracted from the system by at least one output line in order to be reused.

10. The system according to claim 1, further comprising at least one feed line to supply water or substances added to water.

11. The system according to claim 1, whereby the system is also functionally connected to naturally created areas or artificially created areas or green spaces.

12. The system according to claim 11, whereby the areas or green spaces belonging to the system are completely separated from their natural environment using water technology, in such a way that they can be managed separately.

13. An installation for industrial, farming, agro-industrial, or landscaping activities, which features a system according to claim 1.

14. The system according to claim 1, wherein the material includes a contaminant.

15. A method for closed liquid circulation, comprising:
   treating with liquid treatment media a material disposed in a liquid impermeable, outwardly delimited reservoir;
   collecting the liquid treatment media in a collection container located within the reservoir and positioned on or near the bottom of the reservoir, whereby the collection container includes at least one opening, through which the liquid treatment media flows into the collection container;
   extracting the liquid treatment media collected in the collection container from the reservoir, using a liquid extraction device;
   conditioning the liquid treatment media extracted from the reservoir in a conditioning device; and
   driving back into the reservoir the conditioned liquid treatment media, using a recirculation device.

16. The method according to claim 15, whereby the treatment of the material includes eluting impurities from the material.

17. The method according to claim 15, whereby the liquid extraction device includes a pumping system, through which the liquid treatment media is directed from the collection container to the conditioning device and further through the recirculation device until it gets back into the reservoir.

18. The method according to claim 15, whereby conditioning includes replacing the liquid treatment media with a substance or material needed for the treatment, or the cleaning of the liquid treatment media involves isolating a liquid-contaminating substance or material in the reservoir.

19. The method according to claim 15, wherein the liquid treatment media includes water.

20. A system for closed liquid circulation, comprising:
   a liquid impermeable, outwardly delimited reservoir for collecting liquid treatment media;
   a material provided in the reservoir, which is to be treated with the liquid treatment media;
   a collection container located within the reservoir and positioned on or near the bottom of the reservoir, wherein the collection container includes at least one opening, through which the liquid treatment media can flow;
   a liquid extraction device to extract the liquid treatment media collected in the collection container from the reservoir;
   a conditioning device, designed to condition for reuse in the system the liquid treatment media extracted from the reservoir; and
   a recirculation device, designed to drive back into the reservoir the conditioned liquid treatment media.

* * * * *